United States Patent
Buskens et al.

(10) Patent No.: US 7,426,715 B2
(45) Date of Patent: Sep. 16, 2008

(54) SHUTTING DOWN A PLURALITY OF SOFTWARE COMPONENTS IN AN ORDERED SEQUENCE

(75) Inventors: Richard W. Buskens, Robbinsville, NJ (US); Oscar J. Gonzalez, Bridgewater, NJ (US); Li Kuang, Lisle, IL (US); Tim T. Liim, Holmdel, NJ (US); Yow-Jian Lin, Edison, NJ (US); Sunil K. Mishra, Aurora, IL (US); Muhammad A. Siddiqui, Monmouth Junction, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 679 days.

(21) Appl. No.: 10/868,142

(22) Filed: Jun. 14, 2004

(65) Prior Publication Data

US 2005/0278700 A1 Dec. 15, 2005

(51) Int. Cl.
*G06F 9/44* (2006.01)
*G06F 9/46* (2006.01)
*G06F 15/16* (2006.01)

(52) U.S. Cl. .................. 717/120; 717/103; 718/106; 709/229

(58) Field of Classification Search .................. None
See application file for complete search history.

(56) References Cited

U.S. PATENT DOCUMENTS

| 5,713,027 | A   * | 1/1998  | Soejima et al. .......... 713/300 |
| 2002/0087734 | A1 * | 7/2002 | Marhsall et al. .......... 709/310 |
| 2005/0278689 | A1 * | 12/2005 | Gong et al. .............. 717/103 |
| 2006/0080411 | A1 * | 4/2006 | Buskens et al. .......... 709/220 |

OTHER PUBLICATIONS

Lucent Technologies Inc., "Statement Disclosing Information About Development and Use of Technology", 2002 to 2004, 3 pgs., Murray Hill, NJ, USA.

* cited by examiner

*Primary Examiner*—Chuck O Kendall

(57) ABSTRACT

An apparatus in one example comprises a manager component in communication with a distributed software application. The distributed software application comprises a plurality of software components that run within one or more executables. The manager component shuts down the plurality of software components in an ordered sequence based on one or more dependency relationships among the plurality of software components.

20 Claims, 2 Drawing Sheets

SHUTTING DOWN A PLURALITY OF SOFTWARE COMPONENTS IN AN ORDERED SEQUENCE

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties.

"INSTRUCTING MANAGEMENT SUPPORT SOFTWARE OF A FIRST SOFTWARE COMPONENT TO SET UP A COMMUNICATION CHANNEL BETWEEN THE FIRST SOFTWARE COMPONENT AND A SECOND SOFTWARE COMPONENT," by Buskens, et al., Ser. No. 10/868,128 co-filed herewith;

"SELECTING A PROCESSOR TO RUN AN EXECUTABLE OF A DISTRIBUTED SOFTWARE APPLICATION UPON STARTUP OF THE DISTRIBUTED SOFTWARE APPLICATION," by Buskens, et al., Ser. No. 10/868,404 co-filed herewith;

"SOFTWARE COMPONENT INITIALIZATION IN AN ORDERED SEQUENCE," by Buskens, et al., co-filed herewith;

"DISTRIBUTED SOFTWARE APPLICATION SOFTWARE COMPONENT RECOVERY IN AN ORDERED SEQUENCE," by Buskens, et al., Ser. No. 10/868,404 co-filed herewith;

"MANAGER COMPONENT FOR CHECKPOINT PROCEDURES," by Buskens, et al., Ser. No. 10/867,945 co-filed herewith;

"MANAGER COMPONENT THAT CAUSES FIRST SOFTWARE COMPONENT TO OBTAIN INFORMATION FROM SECOND SOFTWARE COMPONENT," by Buskens, et al., Ser. No. 10/868,469 co-filed herewith;

"FIRST AND SECOND MANAGER COMPONENTS THAT COMMUNICATE TO INITIALIZE AND/OR SHUT DOWN SOFTWARE COMPONENTS IN AN ORDERED SEQUENCE," by Buskens, et al., Ser. No. 10/868,946 co-filed herewith;

"MANAGER COMPONENT RESOURCE ADDITION AND/OR RESOURCE REMOVAL ON BEHALF OF DISTRIBUTED SOFTWARE APPLICATION," by Gong, et al., Ser. No. 10/868,144 co-filed herewith;

"SUBSTITUTE MANAGER COMPONENT THAT OBTAINS STATE INFORMATION OF ONE OR MORE SOFTWARE COMPONENTS UPON FAILURE OF A FIRST MANAGER COMPONENT," by Buskens, et al., Ser. No. 10/868,472 co-filed herewith.

TECHNICAL FIELD

The invention relates generally to distributed software applications and more particularly to management of distributed software applications.

BACKGROUND

In known distributed software applications, software components are distributed among a plurality of executables (i.e., software capsules or software entities). Each of the executables contains one or more software components that perform some portion of the functionality of the distributed software application. The executables of the distributed software application may all run on a single processor or may be divided up and run across a plurality of processors.

During operation of the distributed software application, state information is created, system resources are allocated, and/or databases are updated. If the software components of a distributed software application shut down without a pre-planned shutdown sequence, then the distributed software application may leave system resources in an inconsistent state. As one shortcoming, without a proper shutdown sequence, the distributed software application may not properly store the state information, release the allocated system resources, and/or update the databases.

During shutdown of a distributed software application divided into a plurality of executables running on a single processor, the distributed software application may shut down the executables by following a preplanned shutdown sequence for the executables. As one shortcoming, executing the shutdown sequence at the executable level may not serve to fully leave the system resources in a consistent state. The distributed software application may run on a single processor or the executables of the distributed software application may be divided across a plurality of processors. As another shortcoming, the shutdown sequence is unable to fully coordinate a shutdown of the executables and software components of the distributed software application divided across a plurality of processors.

Thus, a need exists to shut down a distributed software application in a manner that stores state information, releases system resources, and/or leaves the system resources in a consistent state.

SUMMARY

A manager component for a distributed software application employs dependency relationships between software components of the distributed software application during shutdown of the distributed software application. The manager component shuts down the software components in an ordered sequence based on the dependency relationships among the software components. When software components have dependencies on other software components, the manager component shuts down the software components in a proper sequence to store state information, release system resources, and/or leave one or more database of the distributed software application in a consistent state.

In one embodiment, there is provided an apparatus comprising a manager component in communication with a distributed software application. The distributed software application comprises a plurality of software components that run within one or more executables. The manager component shuts down the plurality of software components in an ordered sequence based on one or more dependency relationships among the plurality of software components.

In another embodiment, there is provided an apparatus comprising a manager component that shuts down a first software component, of a distributed software application, that runs on a first processor and a second software component, of the distributed software application, that runs on a second processor in an ordered sequence based on one or more dependency relationships between the first and second software components.

In yet another embodiment, there is provided a method for: obtaining one or more dependency relationships among a plurality of software components that run within one or more executables of a distributed software application; establishing an ordered sequence for shutdown of the plurality of software components based on one or more of the one or more dependency relationships; and shutting down the plurality of software components in the ordered sequence.

DESCRIPTION OF THE DRAWINGS

Features of exemplary implementations of the invention will become apparent from the description, the claims, and the accompanying drawings in which:

DETAILED DESCRIPTION

Figure 1:
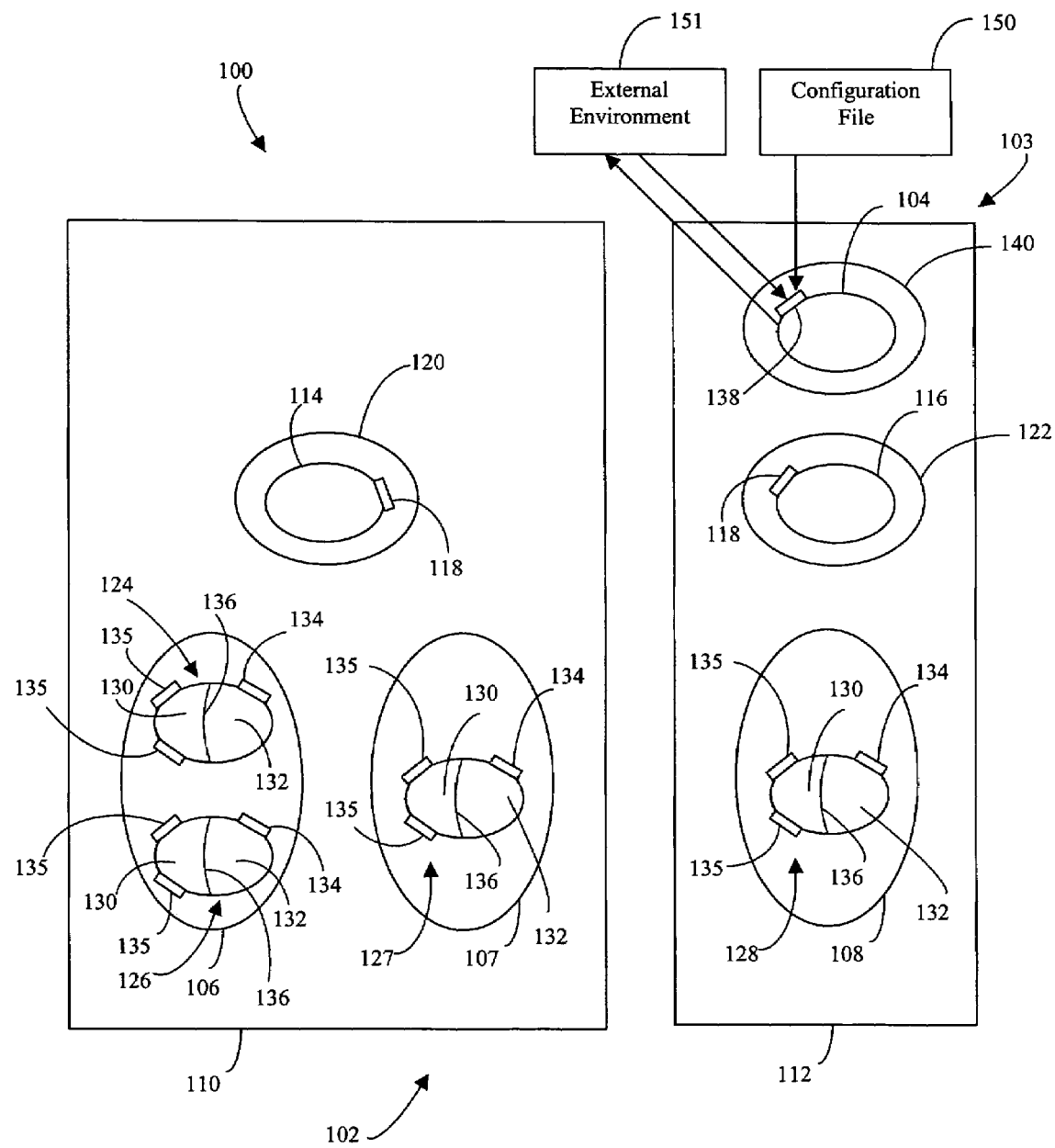
FIG. 1 is a representation of an exemplary implementation of an apparatus that comprises a distributed software application and a management infrastructure.

Turning to FIG. 1, an apparatus 100 in one example comprises a distributed software application 102 and a management infrastructure 103. The management infrastructure 103 performs one or more management operations on the distributed software application 102. The management infrastructure 103 comprises a manager component 104. For example, the manager component 104 may coordinate one or more of starting, stopping, initializing, shutting down, and monitoring the distributed software application 102, detecting failures of the distributed software application 102, recovering the distributed software application 102, propagating state changes about distributed software application 102, and the like.

The distributed software application 102 represents a software application divided among a plurality of executables (i.e., software capsules or software entities). For example, the distributed software application 102 comprises a plurality of executables 106, 107 and 108. The distributed software application 102 may run on a single central processing unit ("CPU") or may be divided between multiple CPUs. For example, the executables 106 and 107 may run on processor 110 and the executable 108 may run on processor 112. The processor 110 comprises an executable manager 114 and the processor 112 comprises an executable manager 116. The executable managers 114 and 116 in one example are part of the management infrastructure 103.

The executable managers 114 and 116 start, stop and monitor executables of the distributed software application 102 that run on the processors 110 and 112, such as the executables 106, 107 and 108. To start or stop the executable 106, the executable manager 114 invokes operating system commands to start or stop the executable 106. The executable managers 114 and 116 monitor communication channels and/or diagnostics on behalf of the executables 106, 107 and 108. Should one or more of the executables 106, 107 and 108 fail, the respective one of the executable managers 114 and 116 informs the manager component 104.

To detect failures of the executables 106, 107 and 108 the executable managers 114 and 116 register with an operating system to receive notifications when the executables 106, 107 and 108 terminate either abnormally or as a result of explicit commands sent to the executables 106, 107 and 108. To detect failures of software components 124, 126, 127 and 128 within the executables 106, 107 and 108, the executable managers 114 and 116 send status queries to the software components 124, 126, 127 and 128 and expect to receive status responses from the software components 124, 126, 127 and 128.

Each of the executable managers 114 and 116 comprise a communication interface 118 for communication with the manager component 104. The executable managers 114 and 116 receive instruction from the manager component 104. For example, the executable managers 114 and 116 may receive instructions at the communication interface 118 from the manager component 104. The executable manager 114 is encapsulated in an executable 120 running on the processor 110 and the executable manager 116 is encapsulated in an executable 122 running on the processor 112.

The executables 106, 107 and 108 comprise one or more software components 124, 126, 127 and 128. For example, the executable 106 encapsulates the software components 124 and 126, the executable 107 encapsulates the software component 127, and the executable 108 encapsulates the software component 128. Within each of the executables 106, 107 and 108 may be tens, hundreds, or even thousands of other software components (e.g., analogous to the software components 124, 126, 127 and 128).

The software components 124, 126, 127 and 128 represent software sub-entities of the executables 106, 107 and 108. For example, the software components 124, 126, 127 and 128 represent logical blocks of software of the executables 106, 107 and 108. The software components 124 and 126 in one example are developed independently and then put together within the executable 106. The software components 124, 126, 127 and 128 each perform some portion of the overall functionality of the distributed software application 102. The software components 124, 126, 127 and 128 work together to make the distributed software application 102 achieve the desired operation. The distributed software application 102 may provide any functionality for a computer system. The distributed software application 102 in one example comprises a call processing software application. For example, the distributed software application 102 sets up and/or tears down telecommunication sessions in a telecommunication network.

In one embodiment, each of the software components 124, 126, 127 and 128 comprise application software 130, management support software 132, a management support software communication interface 134, and one or more application software communication interfaces 135. The software components 124, 126, 127 and 128 employ the management support software communication interfaces 134 to receive communications from the manager component 104. The software components 124, 126, 127 and 128 employ the application software communication interfaces 135 to receive communications from other software components of the software components 124, 126, 127 and 128. An application programming interface ("API") 136 communicatively couples the application software 130 with the management support software 132 in each of the software components 124, 126, 127 and 128. The application software 130 and the management support software 132 can exchange information through the application programming interface 136.

The application software 130 is the portion of the software components 124, 126, 127 and 128 that performs some portion of the overall functionality of the distributed software application 102. The management support software 132 is the portion of the software components 124, 126 and 128 that cooperates with the manager component 104 to perform management operations on the software components 124, 126 and 128. The application software 130 is part of the distributed software application 102 and the management support software 132 is part of the management infrastructure 103.

An application developer creates the application software 130 of the software components 124, 126, 127 and 128 to achieve the designated functionality of the software components 124, 126, 127 and 128. For example, the application developer creates the application software 130 of the software components 124, 126, 127 and 128 to achieve the overall functionality of the distributed software application 102.

To alleviate the application developers from being required to write software into each of the software components 124, 126, 127 and 128 to interface with the manager component 104, a code generator in one example automatically generates the management support software 132. To create the management support software 132, a configuration file 150 in one example is input into the code generator. The configuration file 150 comprises connection information and/or architecture information of the distributed software application 102. The code generator creates code for the management support software 132. The code for the management support software 132 is compiled and linked with the application software 130 in the software components 124, 126, 127 and 128. The management support software 132 may be different for each of the software components 124, 126, 127 and 128, as will be appreciated by those skilled in the art.

The manager component 104 comprises a communication interface 138 for receiving incoming communications. The communication interface 138 is employable for receiving the configuration file 150. The manager component 104 may employ other means to receive the configuration file 150, such as reading the configuration file 150 directly from a disk or file system. The communication interface 138 may also receive communications from the executable managers 114 and 116, as well as communications from the software components 124, 126, 127 and 128.

The manager component 104 may also use the communication interface 138 for receipt of external system information from an external environment 151. In one example, the external environment 151 represents other components of the system that are in communication with the manager component 104. In another example, the external environment 151 represents another management infrastructure in communication with the management infrastructure 103.

The manager component 104 is encapsulated with zero or more other software components in an executable 140. The executable 140 that contains the manager component 104 may be run on either of the processors 110 and 112. The manager component 104 in one example is active and the apparatus 100 may have one or more standby manager components (e.g., analogous to the manager component 104). If the manager component 104 fails, then one of the standby manager components becomes active and gains managerial control of the distributed software application 102.

One advantage to the manager component 104 controlling shutdown of the distributed software application 102 is that the manager component 104 alleviates application developers from being required to write software into each of the software components 124, 126, 127 and 128 to coordinate shutdown. The manager component 104 controls shutdown of the software components 124, 126, 127 and 128 on behalf of the software components 124, 126, 127 and 128. For example, the manager component 104 interfaces with the management support software 132 coupled with the application software 130 in the software components 124, 126, 127 and 128 to sequence shutdown of the software components 124, 126, 127 and 128. Therefore, the manager component 104 saves the application developers effort of creating software to sequence shutdown.

The management infrastructure 103 provides shutdown management functionality as a reusable asset for distributed software applications. The management infrastructure 103 in one example comprises a portion of a high availability ("HA") infrastructure. The manager component 104 in one example comprises a high availability manager component operating in a high availability infrastructure. The high availability infrastructure controls management operations on the software components 124, 126, 127 and 128 for the distributed software application 102. For example, the high availability infrastructure controls shutdown of the software components 124, 126, 127 and 128 in the ordered sequence for the distributed software application 102, along with terminating the executables that encapsulate the software components 124, 126, 127 and 128. The high availability infrastructure is usable to control management operations for the distributed software application 102 or another distributed software application. The high availability infrastructure is able to continue processing while switching between active and standby components in the high availability infrastructure.

To startup of the distributed software application 102, the manager component 104 initializes each of the software components 124, 126, 127 and 128 and each of the executables 106, 107 and 108. The manager component 104 in one example imports the configuration file 150 to obtain connection information of the distributed software application 102. The configuration file 150 provides information to the manager component 104 to allow the manager component 104 to control the distributed software application 102. The configuration file 150 is created to store connection information and/or architecture information of the distributed software application 102. The configuration file 150 in one example provides the manager component 104 with information about the set of executables 106, 107 and 108, the number of each type of the executables 106, 107 and 108, the mapping of the software components 124, 126, 127 and 128 to the executables 106, 107 and 108, the types of the software components 124, 126, 127 and 128, and the number of each type of the software components 124, 126, 127 and 128 in each of the executables 106, 107 and 108.

The configuration file 150 in one example indicates one or more dependency relationships among the software components 124, 126, 127 and 128. The manager component 104 employs a list of the dependency relationships to establish an ordered sequence for startup. The manager component 104 initializes the software components 124, 126, 127 and 128 in the ordered sequence for startup based on the dependency relationships among the software components 124, 126, 127 and 128. For example, if the software component 124 is dependent on the software component 126, then the manager component 104 initializes the software component 126 before initializing the software component 124 as part of the ordered sequence. If the software components 124 and 126 are free from any dependency relationships, then the manager component 104 may initialize the software components 124 and 126 in parallel as part of the ordered sequence.

Once all of the executables 106, 107 and 108 and the software components 124, 126, 127 and 128 are initialized during startup, the distributed software application 102 may run and perform an intended function. During operation of the distributed software application 102, state information is created, resources are allocated, and/or databases are updated. At shutdown of the distributed software application 102, it is desirable to save the state information, release the allocated resources, and confirm that the databases are in a consistent state. To transition the distributed software application 102 from active operation to a non-operational state, the manager component 104 shuts down the distributed software application 102 in an ordered sequence based on the dependency relationships among the software components 124, 126, 127 and 128. The manager component 104 may shut down the distributed software application 102 in the ordered sequence at the level of the software components 124, 126, 127, and 128, then may shutdown the executables 106, 107 and 108. The manager component 104 may coordinate the shutdown of the executables 106, 107 and 108 and/or the software components 124, 126, 127 and 128 running on a single processor or divided among a plurality of processors, such as the processors 110 and 112.

Figure 2:
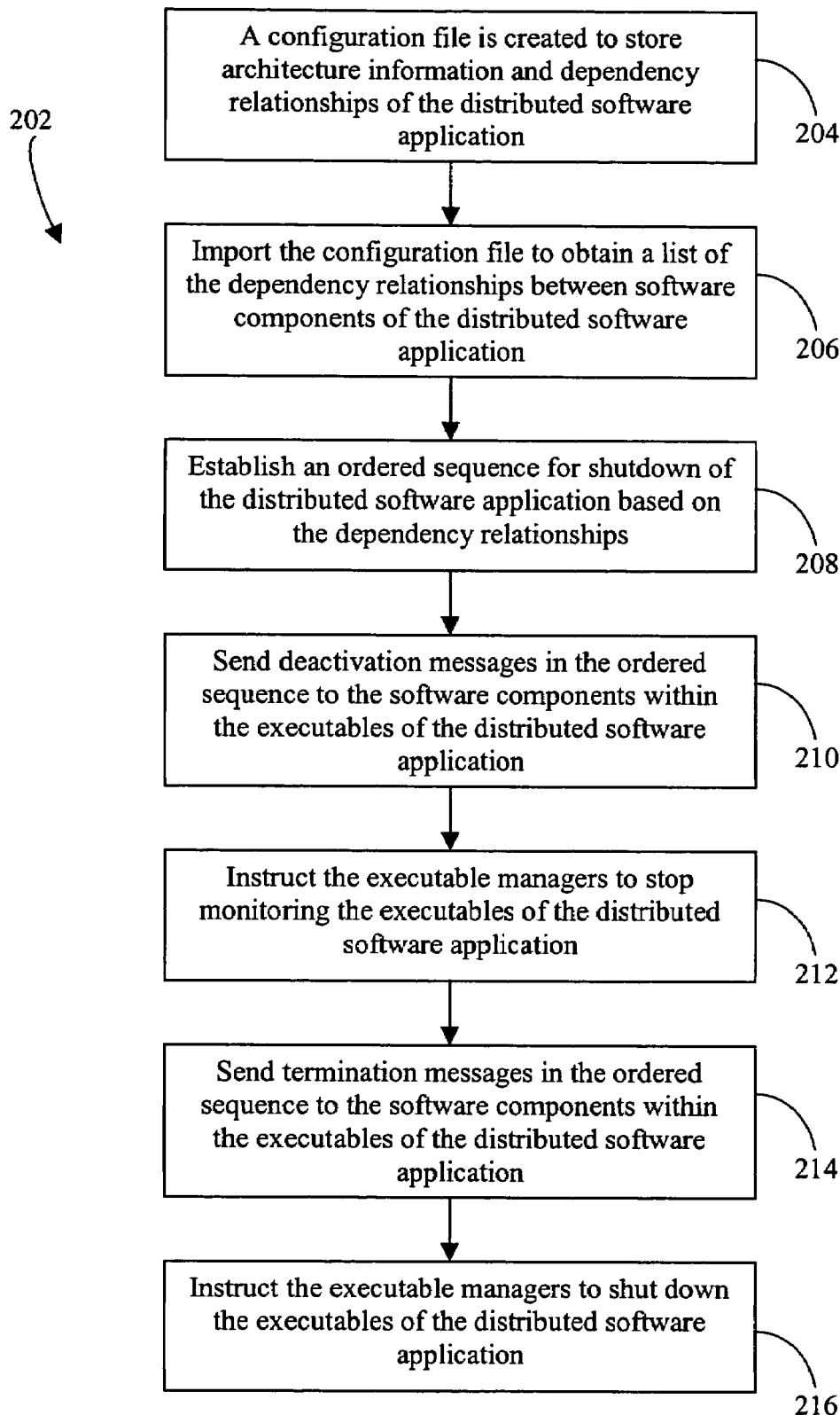
FIG. 2 is a representation of exemplary logic that serves to allow a manager component of the management infrastructure to employ an ordered sequence to shut down the distributed software application of the apparatus of FIG. 1.

Turning to FIGS. 1-2, an illustrative description of one exemplary operation of the apparatus 100 is now presented, for explanatory purposes. The manager component 104 comprises a high availability manager component operating in a high availability infrastructure. To begin operation of the apparatus 100, the distributed software application 102 is configured for control by the manager component 104, and the manager component 104 coordinates the initialization of the distributed software application 102. Exemplary logic 202 serves to allow the manager component 104 to employ an ordered sequence to shut down the distributed software application 102. The logic 202 employs one or more steps, for example, STEPS 204, 206, 208, 210, 212, 214, and 216. An application developer, a system architect, or any other developer performs the STEP 204 of FIG. 2 and the manager component 104 performs the STEPS 206, 208, 210, 212, 214 and 216 of FIG. 2.

To shut down the distributed software application 102, the manager component 104 shuts down the software components 124, 126, 127 and 128 in an ordered sequence based on the dependency relationships among the software components 124, 126, 127 and 128 and/or among the executables 106, 107 and 108. Shutting down the distributed software application 102 in the ordered sequence serves to save a record of state information, release allocated system resources, and properly update databases. The manger component 104 serves to shut down the executables 106, 107 and 108 according to the ordered sequence. The manager component 104 also serves to shut down the software components 124, 126, 127 and 128 running within the executables 106, 107 and 108 according to the ordered sequence.

At STEP 204, the application developer or other developer creates the configuration file 150 to comprise connection information, architecture information, and dependency relationships of the distributed software application 102. At STEP 206, the manager component 104 imports the configuration file 150 to obtain the list of the dependency relationships between the software components 124, 126, 127 and 128. At STEP 208, the manager component 104 employs the list of dependency relationships to establish an ordered sequence for shutdown of the software components 124, 126, 127 and 128 and the executables 106, 107 and 108.

At STEP 210, the manager component 104 deactivates the software components 124, 126, 127 and 128 according to the ordered sequence. For example, the manager component 104 sends deactivation messages to the management support software communication interfaces 134 of the software components 124, 126, 127 and 128 in the ordered sequence. The deactivation messages indicate to the software components 124, 126, 127 and 128 to wrap up any current tasks and to not take on any new tasks. The manager component 104 may also instruct the active software components of the software components 124, 126, 127 and 128 to not send new tasks to the deactivated software components of the software components 124, 126, 127 and 128.

In one exemplary implementation of the distributed software application 102, the software component 124 has a dependency on the software component 126, and the software component 126 (running on the processor 110) has a dependency on the software component 128 (running on the processor 112). The software component 127 in one example is free from dependency relationships. Therefore, the manager component 104 may shut down the software component 127 independently from the other software components 124, 126, and 128. To shutdown of the distributed software application 102 according to the ordered sequence, the manager component 104 determines to shut down the software component 124 before the software component 126, and to shut down the software component 126 before the software component 128.

To begin shutdown of the software components 124, 126, 127 and 128, the manager component 104 in one example sends a first deactivation message to the software component 124 and a second deactivation message to the software component 127. Upon deactivation of the software components 124 and 127, each the software components 124 and 127 send a confirmation message to the manager component 104. Before proceeding, the manager component 104 waits for the confirmation message from the software component 124 to confirm deactivation of the software component 124. Upon receipt of the confirmation message from the software component 124, the manager component 104 may send a third deactivation message to the software component 126. Before proceeding, the manager component 104 waits for a confirmation message from the software component 126 to confirm deactivation of the software component 126. Upon receipt of the confirmation message from the software component 126, the manager component 104 may send a fourth deactivation message to the software component 128. Upon deactivation of the software component 128, the software component 128 sends a confirmation message to the manager component 104.

The manager component 104 sends the deactivation messages to the management support software 132 of the software components 124, 126, 127 and 128. The management support software 132 relays the instruction to deactivate through the application programming interface 136 to the application software 130. After deactivation the application software 130 sends the confirmation messages to the management support software 132. The management support software 132 relays the confirmation messages to the manager component 104.

Communication between the manager component 104 and the management support software 132 of the software components 124, 126, 127 and 128 is resilient to failure. For example, the messages may employ timeouts to handle dropped or delayed messages or confirmation notifications. Upon failure of a deactivation message, the manager component 104 in one example employs a configurable number of retries for the deactivation message.

Once the manager component 104 has deactivated each of the software components 124, 126, 127 and 128 according to the ordered sequence, the manager component 104 may tear down any communication channels between the software components 124, 126, 127 and 128. The manager component 104 then may terminate each of the software components 124, 126, 127 and 128. At STEP 212, before terminating the software components 124, 126, 127 and 128, the manager component 104 instructs the executable managers 114 and 116 to stop monitoring the executables 106, 107 and 108. For example, the manager component 104 sends a message to the communication interface 118 of the executable manager 114 to instruct the executable manager 114 to stop monitoring the executables 106 and 107. The manager component 104 also sends a message to the communication interface 118 of the executable manager 116 to instruct the executable manager 116 to stop monitoring the executable 108.

At STEP 214, the manager component 104 sends termination messages to the management support software communication interfaces 134 of the software components 124, 126, 127 and 128. The termination messages instruct the software components 124, 126, 127 and 128 to stop running. The manager component 104 in one example sends the termination messages in the ordered sequence based on the dependency relationships of the software components 124, 126, 127 and 128, analogously to the deactivation messages, as described herein.

At STEP 216, the manager component 104 instructs the executable managers 114 and 116 to terminate the executables 106, 107 and 108. For example, the manager component 104 sends a message to the communication interface 118 of the executable manager 114 to instruct the executable manager 114 to terminate the executables 106 and 107. The manager component 104 also sends a message to the communication interface 118 of the executable manager 116 to instruct the executable manager 116 to terminate the executable 108. Upon shutdown of the executables 106, 107, and 108, the executable managers 114 and 116 each send a confirmation message to the manager component 104 to indicate a successful shutdown of the executables 106, 107 and 108. Receipt of the confirmation messages from each of the executable managers 114 and 116 indicates to the manager component 104 that the distributed software application 102 is fully shutdown. The executable shutdown messages to the executable managers 114 and 116 and the confirmation messages are resilient to failure, analogously to the deactivation messages and deactivation confirmation messages, as described herein.

In one embodiment, the manager component 104 may determine to not follow the ordered sequence to shut down the distributed software application 102. If a large number of the software components 124, 126, 127 and 128 don't have state information that needs to be preserved and don't need to complete any operations that are in progress, then the manager component 104 may just terminate the software components 124, 126, 127 and 128 in a more efficient manner, such as in parallel.

The apparatus 100 in one example comprises a plurality of components such as one or more of electronic components, hardware components, and/or computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium of the manager component 104. The computer-readable signal-bearing medium for the apparatus 100 in one example comprise one or more of a magnetic, electrical, optical, biological, and atomic data storage medium. For example, the computer-readable signal-bearing medium comprises floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network. The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   a manager component in communication with a distributed software application, wherein the manager component on a processor; and
   wherein the distributed software application comprises a plurality of software components that run within one or more executables; and
   wherein the manager component shuts down the plurality of software components in an ordered sequence based on one or more dependency relationships among the plurality of software components, and wherein the manager component tears down any communication channels between the plurality of software components upon deactivation of each of the plurality of software components.

2. The apparatus of claim 1, wherein the manager component comprises a high availability manager component operating in a high availability infrastructure, and wherein the high availability manager component shuts down the plurality of software components and the one or more executables in the ordered sequence.

3. The apparatus of claim 1, wherein the one or more executables comprise an executable, and wherein the plurality of software components comprises a first software component and a second software component; and
   wherein the first and second software components run within the executable; and
   wherein the one or more dependency relationships comprise a dependency relationship of the first software component on the second software component; and
   wherein based on the dependency relationship on the second software component, the manager component shuts down the first software component before shutting down the second software component as part of the ordered sequence.

4. The apparatus of claim 3, wherein the plurality of software components comprises a third software component and a fourth software component; and
   wherein the third and fourth software components run within the executable; and
   wherein the third and fourth software components are free from the one or more dependency relationships; and
   wherein the manager component shuts down the third and fourth software components in parallel as part of the ordered sequence.

5. The apparatus of claim 3, wherein based on the dependency relationship on the second software component, the manager component sends a first message to the first software component to instruct the first software component to deactivate before sending a second message to the second software component to instruct the second software component to deactivate; and wherein after deactivation of the first and second software components, the manager component sends a termination message to each of the first and second software components to terminate the first and second software components.

6. The apparatus of claim 5, wherein the first and second software components each comprise application software, management support software, and an application programming interface between the application software and the management support software; and
   wherein the manager component sends the first message to the management support software of the first software component, and wherein the management support software of the first software component instructs the application software of the first software component to deactivate; and
   wherein the manager component sends the second message to the management support software of the second software component, and wherein the management support software of the second software component instructs the application software of the second software component to deactivate.

7. The apparatus of claim 3, wherein the executable runs on the processor, and wherein the processor comprises an executable manager that controls the executable; and
   wherein the manager component instructs the executable manager to stop monitonng the executable; and
   wherein after shutdown of the first and second software components within the executable, the manager component instructs the executable manager to terminate the executable.

8. The apparatus of claim 1, wherein the one or more executables comprise a first executable and a second executable, and wherein the plurality of software components comprises a first software component and a second software component; and
   wherein the first software component runs within the first executable, and wherein the second software component runs within the second executable; and
   wherein the one or more dependency relationships comprise a dependency relationship of the first software component on the second software component; and
   wherein based on the dependency relationship on the second software component, the manager component deactivates the first software component within the first executable before deactivating the second software component within the second executable.

9. The apparatus of claim 8, wherein the manager component deactivates the plurality of software components in the ordered sequence across a plurality of processors; and
   wherein the first executable runs on a first processor of the plurality of processors, and wherein the second executable runs on a second processor of the plurality of; and
   wherein based on the dependency relationship on the second software component, the manager component deactivates the first software component on the first processor before deactivating the second software component on the second processor.

10. The apparatus of claim 1, wherein the plurality of software components comprises a first software component and a second software component within the one or more executables; and
    wherein the one or more dependency relationships comprise a dependency relationship of the first software component on the second software component and wherein upon startup of the distributed software application, the manager component starts up the second software component before starting up the first software component; and
   wherein upon shutdown of the distributed software application, the manager component deactivates the first software component before deactivating the second software component.

11. The apparatus of claim 1, wherein the manager component obtains the one or more dependency relationships from a configuration file; and
    wherein the manager component imports the configuration file to determine which one or more software components of the plurality of software components are effected by the one or more dependency relationships.

12. The apparatus of claim 1, wherein the manager component employs the one or more dependency relationships to establish the ordered sequence for the plurality of software components; and
    wherein upon shutdown of the distributed software application, the manager component shuts down the plurality of software components according to the ordered sequence to save state information, release system resources, and/or leave the system resources in a consistent state.

13. The apparatus of claim 1, wherein the one or more executables comprise a first executable and a second executable; and
    wherein the plurality of software components run within the first and second executables, and wherein the manager component runs within a third executable; and
    wherein based on one or more characteristics of the first and second executables, the manager component shuts down the first executable before shutting down the second executable.

14. The apparatus of claim 1, wherein the distributed software application comprises a call processing software application; and
    wherein the manager component oversees shutdown of the plurality of software components for the call processing software application.

15. An apparatus, comprising:
    a manager component that shuts down a first software component, of a distributed software application, that runs on a first processor and a second software component, of the distributed software application that runs on a second processor in an ordered sequence based on one or more dependency relationships between the first and second software components, wherein the manager component tears down any communication channels between the first software component and the second software component upon deactivation of tue first software component and the second software component.

16. The apparatus of claim 15, wherein the manager component comprises a high availability manager component operating in a high availability infrastructure, and wherein the high availability manager component shuts down the first and second software components in the ordered sequence.

17. The apparatus of claim 15, wherein the first and second software components each comprise application software, management support software, and an application programming interface between the application software and the management support software; and
    wherein the manager component sends a first deactivation message to the management support software of the first software component to instruct the application software of the first software component to deactivate; and wherein after deactivation of the first software component on the first processor, the manager component sends a second deactivation message to the management support software of the second software component on the second processor to instruct the application software of the second software component to deactivate; and wherein after deactivation of the first and second software components, the manager component sends a termination message to the management support software of each of the first and second software components to terminate the first and second software components.

18. The apparatus of claim 15, wherein the manager component obtains the one or more dependency relationships from a configuration file; and wherein the manager component employs the one or more dependency relationships to establish the ordered sequence for the first and second software components; and wherein during shutdown of the distributed software application, the manager component shuts down the first and second software components in the ordered sequence.

19. A method, comprising the steps of:

obtaining one or more dependency relationships among a plurality of software components that run within one or more executables of a distributed software application;

establishing an ordered sequence for shutdown of the plurality of software components based on one or more of the one or more dependency relationships; and shutting down the plurality of software components according to the ordered sequence;

tearing down any communication channels between the plurality of software components upon deactivation of each of the plurality of software components.

20. The method of claim 19, wherein the plurality of software components comprise a first software component and a second software component; and wherein the step of obtaining the one or more dependency relationships among the plurality of software components that run within the one or more executables of the distributed software application comprises the step of:

importing a configuration file that indicates a dependency relationship, of the one or more dependency relationships, of the first software component on the second software component;

wherein the step of establishing the ordered sequence for shutdown of the plurality of software components based on the one or more of the one or more dependency relationships comprises the step of:

determining to shut down the first software component before the second software component based on the dependency relationship of the first software component on the second software component;

wherein the step of shutting down the plurality of software components according to the ordered sequence comprises the steps of:

sending a first deactivation message to the first software component to instruct the first software component to deactivate;

sending, after deactivation of the first software component, a second deactivation message to the second software component to instruct the second software component to deactivate; and sending, after deactivation of the first and second software components, a termination message to the management support software of each of the first and second software components to terminate the first and second software components.

* * * * *